US012641568B2

(12) United States Patent
Kim

(10) Patent No.: US 12,641,568 B2
(45) Date of Patent: May 26, 2026

(54) LOCATION TRACKING METHOD, SERVER AND PROGRAM USING THE SAME

(71) Applicant: OPENIT INC., Seoul (KR)

(72) Inventor: Min Young Kim, Seoul (KR)

(73) Assignee: OPENIT INC., Seoul (KR)

( * ) Notice: Subject to any disclaimer, the term of this patent is extended or adjusted under 35 U.S.C. 154(b) by 732 days.

(21) Appl. No.: 18/061,303

(22) Filed: Dec. 2, 2022

(65) Prior Publication Data

US 2024/0179673 A1     May 30, 2024

(30) Foreign Application Priority Data

Nov. 25, 2022     (KR) ........................ 10-2022-0160836

(51) Int. Cl.
H04W 64/00      (2009.01)
H04W 4/80       (2018.01)
H04W 88/04       (2009.01)

(52) U.S. Cl.
CPC ........... H04W 64/006 (2013.01); H04W 4/80 (2018.02); *H04W 88/04* (2013.01)

(58) Field of Classification Search
CPC ..... H04W 64/006; H04W 4/80; H04W 88/04; H04W 4/029; H04W 64/00; H04W 4/025; H04W 88/16
See application file for complete search history.

(56) References Cited

U.S. PATENT DOCUMENTS

| | | | |
|---|---|---|---|
| 2015/0126234 A1* | 5/2015 | Rodriguez | ........ H04M 1/72412 |
| | | | 455/457 |
| 2017/0124836 A1* | 5/2017 | Chung | ............... G08B 21/0415 |
| 2019/0114894 A1* | 4/2019 | Irukayama | ............. H04M 11/00 |

FOREIGN PATENT DOCUMENTS

| | | |
|---|---|---|
| KR | 10-2009-0052411 A | 5/2009 |
| KR | 10-2400282 B1 | 5/2022 |
| KR | 10-2022-0086360 A | 6/2022 |

OTHER PUBLICATIONS

Communication issued Jan. 8, 2025 in Korean application No. 10-2022-0160836.

* cited by examiner

*Primary Examiner* — Kathy W Wang-Hurst
(74) *Attorney, Agent, or Firm* — Sughrue Mion, PLLC

(57)     ABSTRACT

Provided are a location tracking method capable of controlling setting of a short-range wireless communication terminal based on search results of assistant terminals adjacent to a communication relay device when a short-range wireless communication terminal, which is an intensive tracking target, enters an area in which the short-range wireless communication terminal can communicate with the communication relay device, and a server and a program using the location tracking method.

15 Claims, 3 Drawing Sheets

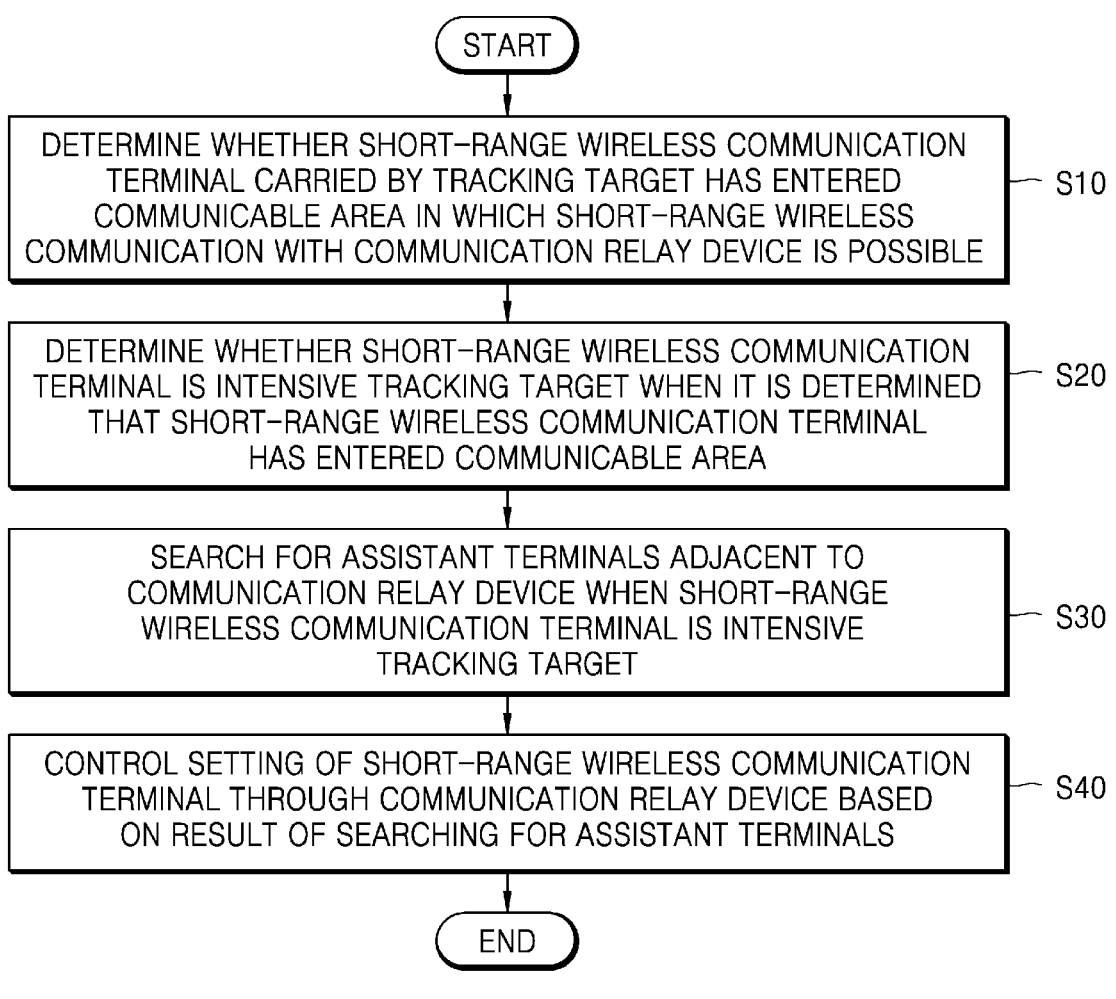

START

DETERMINE WHETHER SHORT-RANGE WIRELESS COMMUNICATION TERMINAL CARRIED BY TRACKING TARGET HAS ENTERED COMMUNICABLE AREA IN WHICH SHORT-RANGE WIRELESS COMMUNICATION WITH COMMUNICATION RELAY DEVICE IS POSSIBLE — S10

DETERMINE WHETHER SHORT-RANGE WIRELESS COMMUNICATION TERMINAL IS INTENSIVE TRACKING TARGET WHEN IT IS DETERMINED THAT SHORT-RANGE WIRELESS COMMUNICATION TERMINAL HAS ENTERED COMMUNICABLE AREA — S20

SEARCH FOR ASSISTANT TERMINALS ADJACENT TO COMMUNICATION RELAY DEVICE WHEN SHORT-RANGE WIRELESS COMMUNICATION TERMINAL IS INTENSIVE TRACKING TARGET — S30

CONTROL SETTING OF SHORT-RANGE WIRELESS COMMUNICATION TERMINAL THROUGH COMMUNICATION RELAY DEVICE BASED ON RESULT OF SEARCHING FOR ASSISTANT TERMINALS — S40

END

LOCATION TRACKING METHOD, SERVER AND PROGRAM USING THE SAME

CROSS-REFERENCE TO RELATED APPLICATION

This application claims the benefit of Korean Patent Application No. 10-2022-0160836, filed on Nov. 25, 2022, in the Korean Intellectual Property Office, the disclosure of which is incorporated herein in its entirety by reference.

BACKGROUND

1. Field

The present disclosure relates to a location tracking method, and a server and a program using the same, and more particularly, to a location tracking method capable of controlling setting of a short-range wireless communication terminal based on search results of assistant terminals adjacent to a communication relay device when a short-range wireless communication terminal, which is an intensive tracking target, enters an area in which the short-range wireless communication terminal can communicate with the communication relay device, and a server and a program using the location tracking method.

2. Description of the Related Art

In general, short-range wireless communication uses a relatively close range within several tens of meters defined in a wireless personal area network (WPAN) or a wireless local area network (WLAN) as a communication range.

Because a terminal using a short-range wireless communication method has limitations in a communication range, communication with other devices becomes impossible when the terminal moves out of the communication range. Accordingly, when a location tracking target has a terminal supporting only a short-range wireless communication method, a method of intensively tracking a location of the terminal in a communication capable state is required.

SUMMARY

Provided are a location tracking method capable of controlling setting of a short-range wireless communication terminal based on search results of assistant terminals adjacent to a communication relay device when a short-range wireless communication terminal, which is an intensive tracking target, enters an area in which the short-range wireless communication terminal can communicate with the communication relay device, and a server and a program using the location tracking method.

According to an aspect of an embodiment, a location tracking method may comprise determining whether a short-range wireless communication terminal carried by a tracking target has entered a communicable area in which short-range wireless communication with a communication relay device is possible, determining whether the short-range wireless communication terminal is an intensive tracking target as it is determined that the short-range wireless communication terminal has entered the communicable area, searching for assistant terminals adjacent to the communication relay device when the short-range wireless communication terminal is the intensive tracking target, and controlling setting of the short-range wireless communication terminal through the communication relay device based on a result of the searching for the assistant terminals.

According to an aspect of an embodiment, the short-range wireless communication terminal may use at least one communication method from among Bluetooth, Zigbee, Radio-Frequency Identification (RFID), Ultra-Wide Band (UWB), and Wi-Fi.

According to an aspect of an embodiment, the communication relay device may be a gateway or a wireless access point (WAP).

According to an aspect of an embodiment, the determining of whether the short-range wireless communication terminal has entered the communicable area may comprise determining according to whether a radio signal transmitted from the short-range wireless communication terminal is received by the communication relay device.

According to an aspect of an embodiment, the determining of whether the short-range wireless communication terminal has entered the communicable area may comprise determining according to whether a radio signal transmitted from the short-range wireless communication terminal is received by the communication relay device.

According to an aspect of an embodiment, the predicted path may be determined based on characteristics of a tracking target carrying the short-range wireless communication terminal and a past movement pattern of the tracking target.

According to an aspect of an embodiment, the determining of whether the short-range wireless communication terminal is an intensive tracking target may comprise determining whether the short-range wireless communication terminal is the intensive tracking target based on identification information of the short-range wireless communication terminal transmitted from the short-range wireless communication terminal or identification information of the tracking target.

According to an aspect of an embodiment, the searching for the assistant terminals adjacent to the communication relay device may comprise searching for assistant terminals adjacent to the communication relay device by using at least one of current location information of each of the assistant terminals, past activity histories of owners of the assistant terminals, and address information of the owners of the assistant terminals.

According to an aspect of an embodiment, the controlling of setting of the short-range wireless communication terminal through the communication relay device may comprise determining possibility of assistance based on a result of the searching for the assistant terminals, and controlling setting of the short-range wireless communication terminal through the communication relay device when the determined possibility of assistance exceeds a reference value.

According to an aspect of an embodiment, the possibility of assistance may be determined based on at least one of the number of searched assistant terminals, signal strength of searched assistant terminals, a time for which signal detection of searched assistant terminals is maintained, and assistance histories of owners of searched assistant terminals.

According to an aspect of an embodiment, the controlling of setting of the short-range wireless communication terminal through the communication relay device may comprise determining possibility of assistance based on a result of the searching for the assistant terminals, and searching for assistant terminals existing in an extended range when the determined possibility of assistance is equal to or less than a reference value.

According to an aspect of an embodiment, the controlling of setting of the short-range wireless communication terminal through the communication relay device may comprise controlling setting of the short-range wireless communication terminal so that the signal transmission level of the transmitter included in the short-range wireless communication terminal is higher.

According to an aspect of an embodiment, the controlling of setting of the short-range wireless communication terminal through the communication relay device may comprise controlling setting of the short-range wireless communication terminal so that the signal transmission mode of the transmitter included in the short-range wireless communication terminal is switched to a long-range communication mode.

According to an aspect of an embodiment, the controlling of setting of the short-range wireless communication terminal through the communication relay device mau comprise controlling setting of the short-range wireless communication terminal so that the signal transmission period of the transmitter included in the short-range wireless communication terminal is shortened.

According to an aspect of an embodiment, the controlling of setting of the short-range wireless communication terminal through the communication relay device may comprise controlling sound of a sound generator included in the short-range wireless communication terminal or controlling light emission of a light source included in the short-range wireless communication terminal.

According to an aspect of an embodiment, the controlling of setting of the short-range wireless communication terminal through the communication relay device mau comprise controlling setting of the short-range wireless communication terminal so that controlled setting of the short-range wireless communication terminal is restored when a reference time elapses after the short-range wireless communication terminal leaves the communicable area.

According to an aspect of an embodiment, the controlling of setting of the short-range wireless communication terminal through the communication relay device may comprise checking a location of the short-range wireless communication terminal requiring setting control, and starting setting control when the short-range wireless communication terminal is located within a settable area.

According to an aspect of an embodiment, a location tracking server with a memory and a processor, may comprise an entry determiner configured to determine whether a short-range wireless communication terminal carried by a tracking target has entered a communicable area in which short-range wireless communication with a communication relay device is possible, an intensive tracking target determiner configured to determine whether the short-range wireless communication terminal is an intensive tracking target as it is determined that the short-range wireless communication terminal has entered the communicable area, an assistant terminal searcher configured to search for assistant terminals adjacent to the communication relay device when the short-range wireless communication terminal is the intensive tracking target, and a setting controller configured to control setting of the short-range wireless communication terminal through the communication relay device based on a result of the searching for the assistant terminals.

BRIEF DESCRIPTION OF THE DRAWINGS

These and/or other aspects will become apparent and more readily appreciated from the following description of the embodiments, taken in conjunction with the accompanying drawings in which:

FIG. 3 is a flowchart illustrating a location tracking method according to an embodiment.

DETAILED DESCRIPTION

Figure 1:
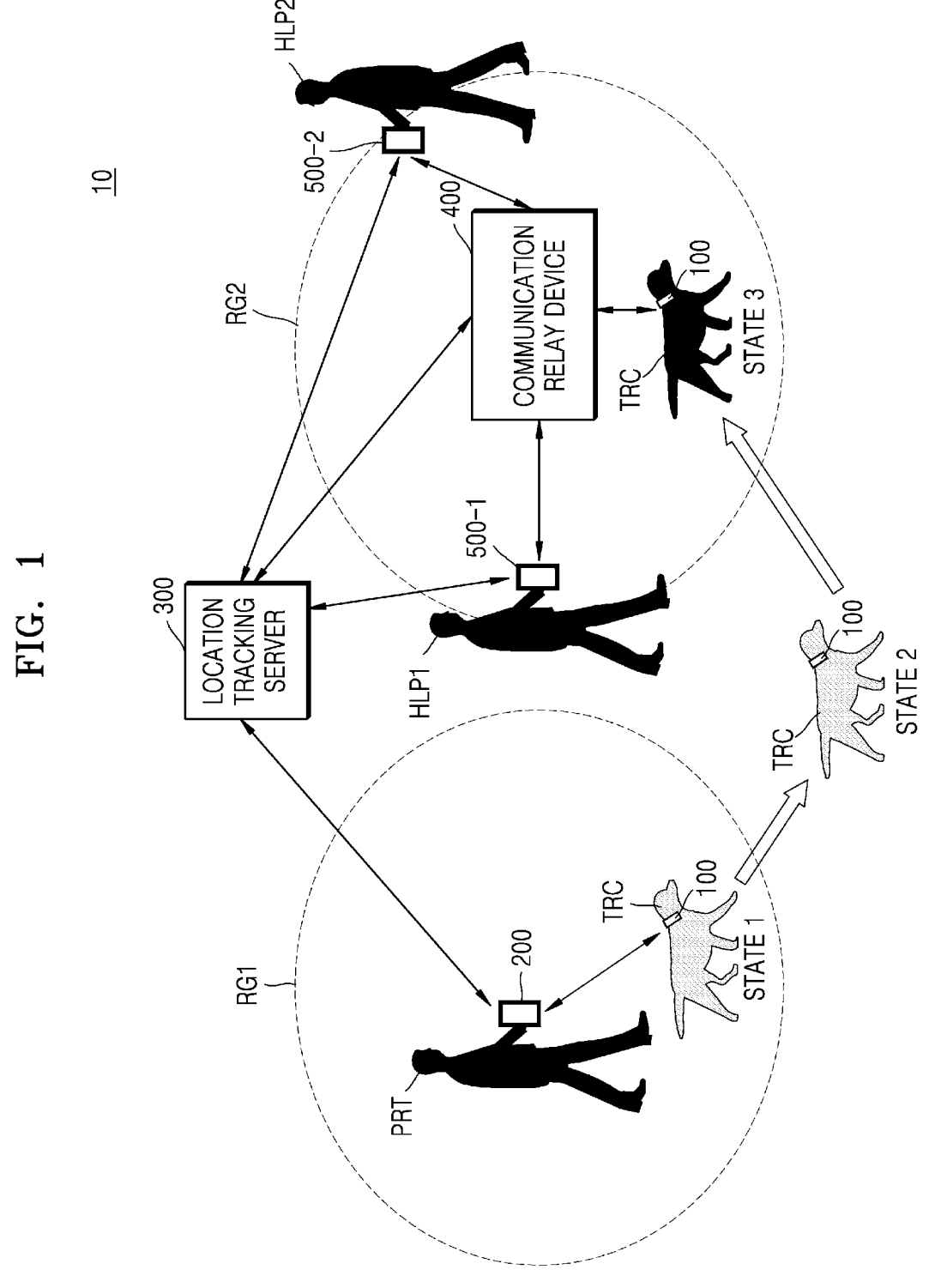
FIG. 1 is a conceptual diagram of a location tracking system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

FIG. 1 is a conceptual diagram of a location tracking system according to an embodiment.

Referring to FIG. 1, a location tracking system 10 according to an embodiment may include a short-range wireless communication terminal 100 carried by a tracking target TRC subject to location tracking, a protector terminal 200 carried by a protector PRT that protects or monitors the tracking target TRC, a location tracking server 300, a communication relay device 400, and assistant terminals 500-1 and 500-2 carried by a plurality of helpers HLP1 and HLP2, respectively.

Although a companion animal is shown as an example of the tracking target TRC in FIG. 1, according to the embodiment, the tracking target TRC needs to be tracked or monitored and may be changed in various ways such as infants, patients, and the elderly who can carry the short-range wireless communication terminal 100.

The short-range wireless communication terminal 100 carried by the tracking target TRC may perform short-range wireless communication with other terminals.

According to an embodiment, short-range wireless communication may have a relatively close communication range within several tens of meters defined in a WPAN or WLAN.

For example, the short-range wireless communication may be communication using at least one communication method from among Bluetooth, Zigbee, Radio-Frequency Identification (RFID), Ultra-Wide Band (UWB), and Wi-Fi.

According to an embodiment, the short-range wireless communication terminal 100 may be carried in various forms by the tracking target TRC. For example, the short-range wireless communication terminal 100 may be implemented in the form of a wearable device that can be worn by the tracking target TRC.

For example, when the tracking target TRC is a companion animal, the short-range wireless communication terminal 100 may be carried in a form fastened to a leash or harness of the companion animal.

According to an embodiment, the short-range wireless communication terminal 100 may include a transmitter for transmitting a radio signal to another device through short-range wireless communication.

According to an embodiment, the short-range wireless communication terminal 100 may be a terminal capable of only short-range wireless communication with the adjacent protector terminal 200 or the communication relay device 400 and not capable of long-range wireless communication (e.g., cellular communication, etc.).

According to an embodiment, in this case, the radio signal may include identification information of the short-range wireless communication terminal 100 or identification information of the tracking target TRC carrying the short-range wireless communication terminal 100, wherein the identification information of the short-range wireless communication terminal 100 or the identification information of the tracking target TRC may be stored in a memory inside the short-range wireless communication terminal 100.

According to an embodiment, the identification information of the short-range wireless communication terminal 100 may refer to various pieces of information for identifying the short-range wireless communication terminal 100, and may include, for example, a media access control (MAC) address and international mobile equipment identity (IMEI).

According to an embodiment, the identification information of the tracking target TRC may include various information about the tracking target TRC, such as the name, age, gender, identification number (e.g., resident registration number, animal registration number, etc.), phone number, or residence of the tracking target TRC.

According to an embodiment, the short-range wireless communication terminal 100 may include a sound generator for generating sound to the outside.

According to an embodiment, the short-range wireless communication terminal 100 may include a light source for generating light to the outside.

According to an embodiment, the short-range wireless communication terminal 100 may directly collect location data of the short-range wireless communication terminal 100 using various methods (e.g., Received Signal Strength (RSS), Time of Flight (TOF), angle of arrival, indoor geomagnetic field distribution pattern, etc.).

According to an embodiment, the short-range wireless communication terminal 100 may include a sensor for collecting motion-sensing data (e.g., accelerometer, gyro sensor, etc.).

According to an embodiment, the short-range wireless communication terminal 100 may include a sound sensor for obtaining external sound (e.g., microphone).

According to an embodiment, the short-range wireless communication terminal 100 may include a sensor capable of sensing a contact state between the short-range wireless communication terminal 100 and the tracking target TRC carrying the short-range wireless communication terminal 100.

The protector terminal 200 carried by the protector PRT may be implemented to enable both short-range wireless communication and long-range wireless communication.

The protector terminal 200 may receive a radio signal transmitted from the adjacent short-range wireless communication terminal 100 through short-range wireless communication, and may communicate with the location tracking server 300 through long-range wireless communication (e.g., cellular communication, etc.) or short-range wireless communication (e.g., WiFi communication, etc.).

The location tracking server 300 may track or monitor a location of the tracking target TRC by performing wireless communication with the protector terminal 200, the communication relay device 400, and the plurality of assistant terminals 500-1 and 500-2.

When the short-range wireless communication terminal 100 enters a first communicable area RG1 in which short-range wireless communication with the protector terminal 200 of the protector PRT is possible, the location tracking server 300 may confirm that the short-range wireless communication terminal 100 is within the first communicable area RG1 through the protector terminal 200.

When the short-range wireless communication terminal 100 enters a second communicable area RG2 in which short-range wireless communication with the communication repeater 400 is possible, the location tracking server 300 may confirm that the short-range wireless communication terminal 100 is within the second communicable area RG2 through the communication relay device 400.

According to an embodiment, when performing a type of communication in which the protector terminal 200 or the communication relay device 400 receives a radio signal periodically transmitted by the short-range wireless communication terminal 100, ranges of the communicable areas RG1 and RG2 may be determined by a distance that a radio signal of the short-range wireless communication terminal 100 may reach.

For example, when communication is performed through a beacon included in the short-range wireless communication terminal 100, ranges of the communicable areas RG1 and RG2 may be determined by a distance that a Bluetooth signal transmitted by the beacon may reach.

The communication relay device 400 may be located on a path on which the tracking target TRC frequently moves, and may transmit corresponding information to the location tracking server 300 when the short-range wireless communication terminal 100 of the tracking target TRC enters the second communicable area RG2.

According to an embodiment, the communication relay device 400 may be implemented to enable both short-range wireless communication and long-range wireless communication.

According to an embodiment, the communication relay device 400 may be a gateway or a wireless access point (WAP).

Although only one communication relay device 400 is shown in FIG. 1 for convenience of description, a plurality of communication relay devices may be located at various places on a path on which the tracking target TRC frequently moves. In this case, each of the plurality of communication relay devices may communicate with the location tracking server 300.

The communication relay device 400 may directly communicate with each of the assistant terminals 500-1 and 500-2 of the assistants HLP1 and HLP2 through short-range wireless communication. In this case, a short-range wireless communication range of the communication relay device 400 may be greater than a short-range wireless communication range of the short-range wireless communication terminal 100.

The assistant terminals 500-1 and 500-2 respectively carried by the assistants HLP1 and HLP2 may be implemented to enable both short-range wireless communication and long-range wireless communication.

The assistant terminals 500-1 and 500-2 may receive a radio signal transmitted from the adjacent communication relay device 400 through short-range wireless communication, and may communicate with the location tracking server 300 through long-range wireless communication (e.g., cellular communication, etc.) or short-range wireless communication (e.g. Wi-Fi communication, etc.).

In a case of a first state STATE1 in which the tracking target TRC exists within the first communicable area RG1 of the protector PRT, the tracking target TRC generally exists at a location within a field of view of the protector PRT. In addition, because the protector terminal 200 of the protector PRT may receive a radio signal from the short-range wireless communication terminal 100 of the tracking target TRC through short-range wireless communication, the protector PRT may confirm that the tracking target TRC is within a close distance. That is, the tracking target TRC may be regarded as being under the management of the protector PRT.

In a case of a second state STATE2 in which the tracking target TRC is out of the first communicable area RG1 of the protector PRT, the tracking target TRC exists at a location out of the sight of the protector PRT. In addition, because the protector terminal 200 of the protector PRT cannot receive a radio signal from the short-range wireless communication terminal 100 of the tracking target TRC through short-range wireless communication, the protector PRT may confirm that the tracking target TRC is not within a close distance, but cannot know in which range the tracking target TRC is located. That is, the tracking target TRC may be regarded as outside a management scope of the protector PRT.

In a case of a third state STATE3 in which the tracking target TRC exists within the second communicable area RG2 of the communication relay device 400, the tracking target TRC exists at a location out of the sight of the protector PRT. In addition, although the protector terminal 200 of the protector PRT cannot receive a radio signal from the short-range wireless communication terminal 100 of the tracking target TRC through short-range wireless communication, the communication relay device 400 receives the radio signal of the short-range wireless communication terminal 100 and transmits information about the received radio signal to the location tracking server 300, so that the protector PRT may confirm that the tracking target TRC is within a close distance (e.g., the second communicable area RG2) to the communication relay device 400.

In the third state STATE3, the protector PRT may confirm that the tracking target TRC is within a close distance to the communication relay device 400, but there is a physical distance between the protector PRT and the tracking target TRC. Accordingly, it takes time for the protector PRT to move to a location where the tracking target TRC is located, and during that time, the tracking target TRC may leave the second communicable area RG2 and move to another location. Even when the tracking target TRC moves out of the second communicable area RG2 and moves to another location, help from the adjacent helpers HLP1 and HLP2 is required to track the location of the tracking target TRC. In addition, in order to track the location of the tracking target TRC out of the second communicable area RG2, it may be required to control setting of the short-range wireless communication terminal 100 of the tracking target TRC to increase the possibility of tracking the location in a situation where the helpers HLP1 and HLP2 may help.

A detailed operation method of the location tracking system 10 according to an embodiment will be described later with reference to FIGS. 2 and 3 together.

Figure 2:
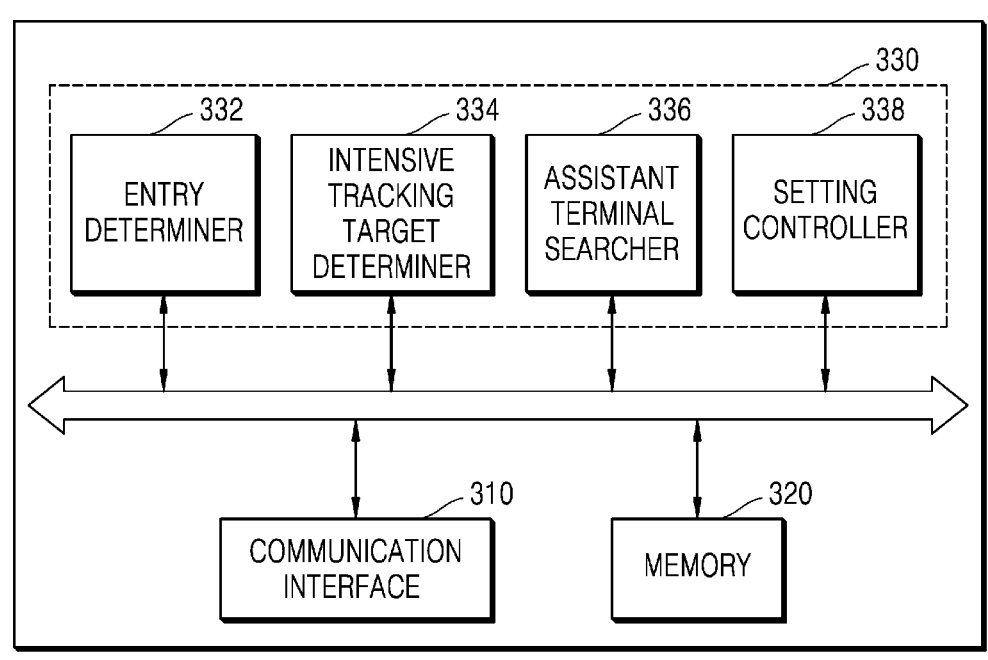
FIG. 2 is a block diagram of a location tracking server shown in FIG. 1, according to an embodiment.

FIG. 2 is a block diagram of a location tracking server shown in FIG. 1, according to an embodiment.

Referring to FIGS. 1 and 2, the location tracking server 300 may include a communication interface 310, a memory 320, and a processor 330.

The communication interface 310 may interface communication between the location tracking server 300 and the protector terminal 200, communication between the location tracking server 300 and the communication relay device 400, and communication between the location tracking server 300 and the assistant terminals 500-1 and 500-2, and may process data or signals transmitted and received during interfacing.

The memory 320 may temporarily or permanently store data required to process the processor 330, data generated during or after the processing of the processor 330, or the like.

The memory 320 may be implemented in various forms capable of storing data, and may be implemented in the form of a database despite the terminology, according to an embodiment.

The processor 330 may include an entry determiner 332, an intensive tracking target determiner 334, an assistant terminal searcher 336, and a setting controller 338.

Each of the entry determiner 332, the intensive tracking target determiner 334, the assistant terminal searcher 336, and the setting controller 338 may mean program code and a logical unit or set of hardware resources capable of executing the program code, and does not necessarily mean physically connected code or a single type of hardware.

The entry determiner 332, the intensive tracking target determiner 334, the assistant terminal searcher 336, and the setting controller 338 may be functionally and logically separated from each other, and this does not necessarily mean that the components are divided into separate physical devices or written in separate codes.

The entry determiner 332 may determine whether the short-range wireless communication terminal 100 carried by the tracking target TRC has entered a communicable area (e.g., the second communicable area RG2) in which short-range wireless communication with the communication relay device 400 is possible.

According to an embodiment, the entry determiner 332 may determine whether the short-range wireless communication terminal 100 has entered a communicable area according to whether a radio signal transmitted from the short-range wireless communication terminal 100 is received by the communication relay device 400. For example, the entry determiner 332 may determine that the short-range wireless communication terminal 100 has entered a communicable area (e.g., the second communicable area RG2) when a radio signal transmitted from the short-range wireless communication terminal 100 is normally received by the communication relay device 400.

According to another embodiment, the entry determiner 332 may determine whether the short-range wireless communication terminal 100 has entered a communicable area (e.g., the second communicable area RG2) according to whether a predicted location along a predicted path of the short-range wireless communication terminal 100 is included within a range in which communication with the communication relay device 400 is possible (e.g., the second communicable area RG2). For example, the entry determiner 332 may determine that the short-range wireless communication terminal 100 has entered a communicable area (e.g., the second communicable area RG2) when a predicted location according to a predicted path of the short-range wireless communication terminal 100 is included within a range in which communication with the communication relay device 400 is possible (e.g., the second communicable area RG2).

According to an embodiment, the predicted path of the short-range wireless communication terminal 100 may be determined based on characteristics (e.g., an average moving speed, etc.) of the tracking target TRC carrying the short-range wireless communication terminal 100 and a past movement pattern (e.g., a frequently traveled moving path, etc.) of the tracking target TRC.

The intensive tracking target determiner 334 may determine whether the short-range wireless communication terminal 100 is an intensive tracking target as it is determined that the short-range wireless communication terminal 100 has entered a communicable area (e.g., the second communicable area RG2).

According to an embodiment, when a situation in which the short-range wireless communication terminal 100 is out of the first communicable area RG1 of the protector terminal 200 is recognized and when the protector PRT confirms that the tracking target TRC needs to be intensively tracked by the location tracking server 300 through the protector terminal 200, the short-range wireless communication terminal 100 may be set as an intensive tracking target.

According to an embodiment, the location tracking server 300 may store, in the memory 320, information about tracking targets that are subjects of intensive tracking (e.g., identification information of the short-range wireless communication terminal 100 or identification information of the tracking target TRC carrying the short-range wireless communication terminal 100).

According to an embodiment, the location tracking server 300 may determine whether a specific short-range wireless communication terminal 100 is an intensive tracking target based on identification information of the short-range wireless communication terminal 100 transmitted from the short-range wireless communication terminal 100 and received through the protector terminal 200 or identification information of the tracking target TRC carrying the short-range wireless communication terminal 100.

When the short-range wireless communication terminal 100 is an intensive tracking target, the assistant terminal searcher 336 may search for assistant terminals (e.g., 500-1 and 500-2) adjacent to the communication relay device 400 corresponding to a communicable area (e.g., the second communicable area RG2) into which the short-range wireless communication terminal 100 has entered.

According to an embodiment, the assistant terminal searcher 336 may obtain identification information of the communication relay device 400 from the communication relay device 400, thereby confirming a location where the communication relay device 400 is installed.

According to an embodiment, the assistant terminal searcher 336 may search for assistant terminals (e.g., 500-1 and 500-2) adjacent to the communication relay device 400 by using at least one of current location information of each of assistant terminals (e.g., 500-1 and 500-2), past activity histories of owners (e.g., HLP1 and HLP2) of assistant terminals (e.g., 500-1 and 500-2), and address information of owners (e.g., HLP1 and HLP2) of assistant terminals (e.g., 500-1 and 500-2).

For example, current location information of each of assistant terminals (e.g., 500-1 and 500-2) may be obtained by receiving location information (e.g., GPS information, etc.) targeting assistant terminals (e.g., 500-1 and 500-2) that are running an application for performing a location tracking method according to an embodiment.

For example, past activity histories or address information of owners (e.g., HLP1 and HLP2) of assistant terminals (e.g., 500-1 and 500-2) may be obtained through data stored in the memory 320 of the location tracking server 300.

The setting controller 338 may control setting of the short-range wireless communication terminal 100 through the communication relay device 400 based on a result of the searching for assistant terminals (e.g., 500-1 and 500-2).

According to an embodiment, the setting controller 338 may determine the possibility of assistance based on the result of the searching for assistant terminals (e.g., 500-1 and 500-2), and may control setting of the short-range wireless communication terminal 100 through the communication relay device 400 when the determined possibility of assistance exceeds a reference value.

According to an embodiment, the possibility of assistance may be determined based on at least one of the number of searched assistant terminals, signal strength of searched assistant terminals, a time for which signal detection of searched assistant terminals is maintained, and an assistance history of an owner of a searched assistant terminal.

For example, signal strength of searched assistant terminals and a time for which signal detection of searched assistant terminals is maintained may refer to signal strength according to short-range wireless communication and a time for which signal detection is maintained when assistant terminals (e.g., 500-1 and 500-2) adjacent to the communication relay device 400 are identified through short-range wireless communication between assistant terminals (e.g., 500-1 and 500-2) and the communication relay device 400.

For example, an assistance history of an owner of a searched assistant terminal may include information about the number of times that owners of searched assistant terminals assisted in tracking locations of other tracking targets in the past, an evaluation by a protector of a tracking target after assistance, and the like.

According to an embodiment, the setting controller 338 may determine the possibility of assistance based on a result of searching for assistant terminals (e.g., 500-1 and 500-2), and when the determined possibility of assistance is equal to or less than a reference value, may search for assistant terminals existing in an extended range.

For example, when the setting controller 338 searches for helpers within a radius of 1 km from the communication relay device 400, but a determined possibility of assistance is less than a reference value, helpers within a radius of 2 km from the communication relay device 400 may be searched by extending the range.

According to an embodiment, the setting controller 338 may control a signal transmission level, a signal transmission mode, or a signal transmission period of a transmitter included in the short-range wireless communication terminal 100.

According to an embodiment, when the setting controller 338 controls a signal transmission level of a transmitter included in the short-range wireless communication terminal 100, the setting may be controlled to increase the signal transmission level of the transmitter.

According to an embodiment, when the setting controller 338 controls a signal transmission mode of a transmitter included in the short-range wireless communication terminal 100, the setting may be controlled so that the signal transmission mode of the transmitter is switched to a long-range communication mode (e.g., a long-range mode).

According to an embodiment, when the setting controller 338 controls a signal transmission period of a transmitter included in the short-range wireless communication terminal 100, the setting may be controlled to shorten the signal transmission period of the transmitter.

According to an embodiment, the setting controller 338 may control sound of a sound generator included in the short-range wireless communication terminal 100, or may control light emission of a light source included in the short-range wireless communication terminal 100. For example, the setting controller 338 may control a sound generator included in the short-range wireless communication terminal 100 to generate sound (e.g., beep sound), or may control a light source included in the short-range wireless communication terminal 100 to generate light of a specific color.

According to an embodiment, when a reference time elapses after the short-range wireless communication terminal 100 leaves a communicable area (e.g., the second communicable area RG2), the setting controller 338 may control setting of the short-range wireless communication terminal 100 so that controlled setting of the short-range wireless communication terminal 100 is restored.

According to an embodiment, the setting controller 338 may check a location of the short-range wireless communication terminal 100 requiring setting control, and may start setting control when the short-range wireless communication terminal 100 is located within a settable area. In this case, the settable area may be set narrower than a communicable area (e.g., the second communicable area RG2) based on a time required for setting control and an average moving speed of the short-range wireless communication terminal 100.

FIG. 3 is a flowchart illustrating a location tracking method according to an embodiment.

Referring to FIGS. 1 to 3, in operation S10, a location tracking server (e.g., 300) according to an embodiment may determine whether a short-range wireless communication terminal (e.g., 100) carried by a tracking target (e.g., TRC) has entered a communicable area (e.g., the second communicable area RG2) in which short-range wireless communication with a communication relay device (e.g., 400) is possible.

According to an embodiment, whether or not a short-range wireless communication terminal (e.g., 100) has entered a communicable area (e.g., the second communicable area RG2) in which short-range wireless communication with a communication relay device (e.g., 400) is possible may be determined based on whether or not a radio signal transmitted from a short-range wireless communication terminal (e.g., 100) is received by a communication relay device (e.g., 400) or whether or not a predicted location along a predicted path of the short-range wireless communication terminal 100 is included within a range in which communication with the communication relay device 400 is possible (e.g., the second communicable area RG2).

In operation S20, a location tracking server (e.g., 300) according to an embodiment may determine whether a short-range wireless communication terminal (e.g., 100) is an intensive tracking target when it is determined that a short-range wireless communication terminal (e.g., 100) has entered a communicable area (e.g., the second communicable area RG2) according to a result of the determination in operation S10.

According to an embodiment, when a situation in which a short-range wireless communication terminal (e.g., 100) is out of a first communicable area (e.g., RG1) of a protector terminal (e.g., 200) is recognized and when a protector (e.g., PRT) confirms that a tracking target (e.g., TRC) needs to be intensively tracked by a location tracking server (e.g., 300) through a protector terminal (e.g., 200), a short-range wireless communication terminal (e.g., 100) may be set as an intensive tracking target.

In operation S30, according to a result of the determination in operation S20, when a short-range wireless communication terminal (e.g., 100) is the intensive tracking target, a location tracking server (e.g., 300) according to an embodiment may search for assistant terminals (e.g., 500-1 and 500-2) adjacent to a communication relay device (e.g., 400).

According to an embodiment, a location tracking server (e.g., 300) may search for assistant terminals (e.g., 500-1 and 500-2) adjacent to a communication relay device (e.g., 400) by using at least one of current location information of each of assistant terminals (e.g., 500-1 and 500-2), past activity histories of owners (e.g., HLP1 and HLP2) of assistant terminals (e.g., 500-1 and 500-2), and address information of owners (e.g., HLP1 and HLP2) of assistant terminals (e.g., 500-1 and 500-2).

In operation S40, a location tracking server (e.g., 300) according to an embodiment may control setting of a short-range wireless communication terminal (e.g., 100) through a communication relay device (e.g., 400) based on a result of the searching for assistant terminals (e.g., 500-1 and 500-2) in operation S30.

According to an embodiment, a location tracking server (e.g., 300) may control a signal transmission level, a signal transmission mode, or a signal transmission period of a transmitter included in a short-range wireless communication terminal (e.g., 100), may control sound of a sound generator included in a short-range wireless communication terminal (e.g., 100), or may control light emission of a light source included in a short-range wireless communication terminal (e.g., 100).

According to an embodiment, the location tracking method according to an embodiment may be implemented as a program including program code for performing operations S10 to S40 and stored in a medium, and a processor may be combined with the medium to execute the program.

A method and devices according to an embodiment may determine the possibility of assistance by searching for adjacent assistant terminals when a tracking target carrying a short-range wireless communication terminal having a limited communication range enters an area in which communication with a communication relay device is possible, and may perform intensive location tracking by controlling setting of the communication relay device when the possibility of assistance is high.

While the present disclosure has been particularly shown and described with reference to embodiments thereof, it will be understood that various changes in form and details may be made therein without departing from the scope of the following claims.

What is claimed is:

1. A location tracking method comprising:

determining whether a short-range wireless communication terminal carried by a tracking target has entered a communicable area in which short-range wireless communication with a communication relay device is possible;

determining whether the short-range wireless communication terminal is an intensive tracking target as it is determined that the short-range wireless communication terminal has entered the communicable area;

searching for assistant terminals adjacent to the communication relay device when the short-range wireless communication terminal is the intensive tracking target;

determining possibility of assistance based on a result of the searching for the assistant terminals; and controlling setting of the short-range wireless communication terminal through the communication relay device based on the determined possibility of assistance, wherein the controlling setting of the short-range wireless communication terminal includes, when the determined possibility of assistance exceeds a reference value, controlling the setting so that a signal transmission level of a transmitter included in the short-range wireless communication terminal is increased, controlling the setting so that a signal transmission mode of the transmitter is switched to a long-range communication mode, or controlling the setting so that a signal transmission cycle of the transmitter is shortened.

2. The location tracking method of claim 1, wherein the short-range wireless communication terminal uses at least one communication method from among Bluetooth, Zigbee, Radio-Frequency Identification (RFID), Ultra-Wide Band (UWB), and Wi-Fi.

3. The location tracking method of claim 1, wherein the communication relay device is a gateway or a wireless access point (WAP).

4. The location tracking method of claim 1, wherein the determining of whether the short-range wireless communication terminal has entered the communicable area comprises:

determining according to whether a radio signal transmitted from the short-range wireless communication terminal is received by the communication relay device.

5. The location tracking method of claim 1, wherein the determining of whether the short-range wireless communication terminal has entered the communicable area comprises:

determining according to whether a predicted location along a predicted path of the short-range wireless communication terminal is included within a range in which communication with the communication relay device is possible.

6. The location tracking method of claim 5, wherein the predicted path is determined based on characteristics of the tracking target carrying the short-range wireless communication terminal and a past movement pattern of the tracking target.

7. The location tracking method of claim 1, wherein the determining of whether the short-range wireless communication terminal is the intensive tracking target comprises:

determining whether the short-range wireless communication terminal is the intensive tracking target based on identification information of the short-range wireless communication terminal transmitted from the short-range wireless communication terminal or identification information of the tracking target.

8. The location tracking method of claim 1, wherein the searching for the assistant terminals adjacent to the communication relay device comprises:

searching for the assistant terminals adjacent to the communication relay device by using at least one of current location information of each of the assistant terminals, past activity histories of owners of the assistant terminals, and address information of the owners of the assistant terminals.

9. The location tracking method of claim 1, wherein the controlling of setting of the short-range wireless communication terminal through the communication relay device comprises:

controlling setting of the short-range wireless communication terminal through the communication relay device when the determined possibility of assistance exceeds the reference value.

10. The location tracking method of claim 9, wherein the possibility of assistance is determined based on at least one of a number of searched assistant terminals, signal strength of searched assistant terminals, a time for which signal detection of searched assistant terminals is maintained, and assistance histories of owners of searched assistant terminals.

11. The location tracking method of claim 1, wherein the controlling of setting of the short-range wireless communication terminal through the communication relay device comprises:

searching for assistant terminals existing in an extended range when the determined possibility of assistance is equal to or less than the reference value.

12. The location tracking method of claim 1, wherein the controlling of setting of the short-range wireless communication terminal through the communication relay device comprises:

controlling sound of a sound generator included in the short-range wireless communication terminal or controlling light emission of a light source included in the short-range wireless communication terminal.

13. The location tracking method of claim 1, wherein the controlling of setting of the short-range wireless communication terminal through the communication relay device comprises:

controlling setting of the short-range wireless communication terminal so that controlled setting of the short-range wireless communication terminal is restored when a reference time elapses after the short-range wireless communication terminal leaves the communicable area.

14. The location tracking method of claim 1, wherein the controlling of setting of the short-range wireless communication terminal through the communication relay device comprises:

checking a location of the short-range wireless communication terminal requiring setting control, and starting setting control when the short-range wireless communication terminal is located within a settable area.

15. A location tracking server with a memory and a processor, the location tracking server comprising:

an entry determiner configured to determine whether a short-range wireless communication terminal carried by a tracking target has entered a communicable area in which short-range wireless communication with a communication relay device is possible;

an intensive tracking target determiner configured to determine whether the short-range wireless communication terminal is an intensive tracking target as it is determined that the short-range wireless communication terminal has entered the communicable area;

an assistant terminal searcher configured to search for assistant terminals adjacent to the communication relay device when the short-range wireless communication terminal is the intensive tracking target; and a setting controller configured to determine possibility of assistance based on a result of the searching for the assistant terminals and control setting of the short-range wireless communication terminal through the communication relay device based the determined possibility of assistance, wherein the setting controller, when the determined possibility of assistance exceeds a reference value, controls the setting so that a signal transmission level of a transmitter included in the short-range wireless communication terminal is increased, controls the setting so that a signal transmission mode of the transmitter is switched to a long-range communication mode, or controls the setting so that a signal transmission cycle of the transmitter is shortened.

* * * * *